UNITED STATES PATENT OFFICE.

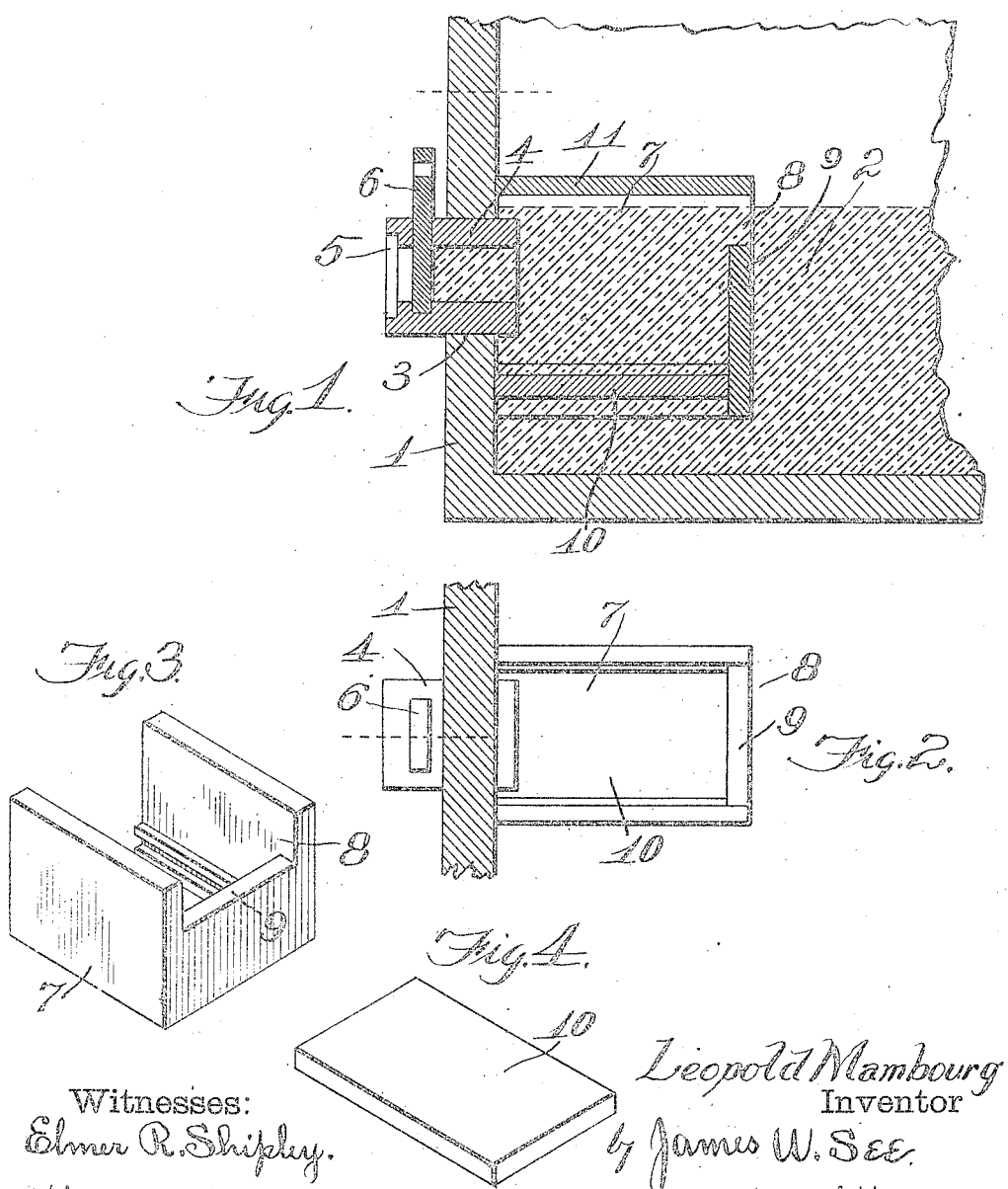

LEOPOLD MAMBOURG, OF COLUMBUS, OHIO, ASSIGNOR OF ONE-THIRD TO WILLIAM C. TAYLOR AND ONE-THIRD TO SYLVIO CASPARIS, OF COLUMBUS, OHIO.

GLASS-MELTING-TANK ACCESSORY.

1,103,066.  Specification of Letters Patent.  Patented July 14, 1914.

Application filed February 2, 1912. Serial No. 675,080.

*To all whom it may concern:*

Be it known that I, LEOPOLD MAMBOURG, a citizen of the United States, residing at Columbus, Franklin county, Ohio, have invented certain new and useful Improvements in Glass-Melting-Tank Accessories, of which the following is a specification.

This invention relates to improvements in accessories of glass-melting tanks designed for use in conjunction with glass-drawing apparatus.

In a melting tank employed in conjunction with glass drawing apparatus, the tank will be provided with an outlet in the main wall of the tank or in the wall of a bay built out therefrom, there being such an outlet for each glass-drawing apparatus employed in connection with the tank, each outlet delivering to the pot of its glass-drawing apparatus.

In use of glass-drawing apparatus the condition of the glass taken from the tank into the pot is of the highest importance. The economical operation of the tank naturally calls for what might be called a driving heat and the nature of the molten glass is such that while in the melting tank and being used there is an enormous difference in the temperature and consistency of the glass, the consistency varying from mere plasticity at the bottom of the tank to a free flowing and very hot liquid glass at the top of the tank. The glass at the top of the mass in the tank may be entirely too hot a liquid for successful use in drawing apparatus, and glass well down in the mass will be too cold and thick for successful use. But at some point between the glass which is too thick and the glass which is too thin there is a level from which glass may be withdrawn in a condition suitable for successful use in a glass-drawing apparatus.

My present invention provides an accessory designed to have the outlet from the tank make its withdrawals of glass in proper condition, and the invention also looks to economy and easy repair of the outlet.

The invention will be readily understood from the following description taken in connection with the accompanying drawing in which:—

Figure 1 is a vertical section at the outlet of a glass-melting tank provided with an outlet accessory exemplifying my invention: Fig. 2 a plan of the same with the cover of the settling chamber omitted: Fig. 3 a perspective view of the settling-chamber isolated from the tank and without its roof or floor: Fig. 4 a perspective view of the floor of the settling-chamber.

In the drawing:—1, indicates the melting tank: 2, the molten glass therein: 3, an opening in the wall of the tank: 4, an outlet block in this opening and having through it an outlet conduit which is to convey the molten glass toward the pot: 5, a counterbore in the outer face of the outlet-block to receive the nose of the pot to which the outlet is to lead: 6, a gate arranged in the outlet block exterior to the tank and adapted to close the outlet: 7, a box-like structure forming a settling-chamber, this settling-chamber being open at its top and at its bottom and at its front, the open front of the settling-chamber being, however, closed by the wall of the tank against which the settling-chamber sets and surrounds the outlet, the side walls of this settling-chamber projecting above the level of the glass in the tank: 8, a notch in the top of the inner wall of the settling-chamber: 9, the inner wall of the settling-chamber, lower than the side walls by reason of the notch 8, this rear wall forming a dam whose upper edge is below the level of the glass in the tank: 10, a removable floor to the settling-chamber: and 11, a removable roof to the settling-chamber.

Assume the pot connected with the drawing apparatus to have its inlet connected with the outlet block at counterbore 5 and assume molten glass in usual working condition to be in the tank with its upper level some distance above the outlet, as indicated in Fig. 1. If the settling-chamber be absent, then the glass may pass through the outlet, gate 6 being open, and go to the pot of the drawing apparatus in the usual manner. If, for any reason, it be necessary to cut off the connection between the tank and the pot it may be done by closing gate 6, which gate is so close to the tank that the glass immediately behind the gate will be retained at such heat as will permit the ready opening of the gate when the connection between the tank and the pot is to be again established. The location of the gate outside the tank permits of the closing of the conduit very much more readily than would be the case with closing devices located within the tank. If, for any reason, it becomes necessary to repair or replace the outlet block, the block is readily removed from the wall of the furnace in the ordinary manner employed in such cases, but in the present case the operation is very much facilitated by means hereafter described, as well as by the fact that the device for closing the outlet block is outside instead of inside the furnace.

Giving attention now, to the settling-chamber, and assuming that its roof 11, and its floor 10 are entirely absent, it is found that the settling-chamber contains a body of glass isolated from the main body of glass in the tank. It may be here stated that while the settling-chamber might if desired be secured to the tank, it may have its weight and size so related to the specific gravity of the molten glass that it will float in the glass at proper height and be held against the wall of the tank by the pressure of the glass.

The depth of notch 8, or the height of dam 9, which is the same thing, is to be so adjusted, by proper selection of settling-chamber structures, that the glass entering the settling-chamber immediately over the dam will, in connection with the upper level of glass entering the settling-chamber, produce in the settling-chamber such temperature and consistency as fits the glass for employment in the glass drawing apparatus. And in this connection it is to be understood that the body of glass isolated within the settling-chamber is protected by the walls of the chamber from the surrounding glass so that there is a lessening of tendency for the surrounding glass to unduly raise or lower the temperature of the glass within the settling-chamber, the settling-chamber thus forming a tempering chamber and providing a body of glass under a degree of control not possible to exercise upon the main body of glass within the tank.

In some cases it may be desirable to protect the body of glass within the settling-chamber from the excessive heating effects of the gases above the glass in the tank, and from the radiation from the roof of the tank. In such cases roof 11, may be applied over the top of the settling-chamber so as to more or less protect the glass according to the position given to the roof which may be applied partly or wholly on the chamber. Again owing to the variations in the working of glass and in the workings of the melting tanks it may be desirable to guard the body of glass within the settling-chamber from the influence of glass tending to go into the open base of the settling-chamber. In such cases the floor 10 may be applied to the settling-chamber. This floor may be used without the roof, and the roof may be used without the floor or the two may be used together.

Such manipulation as may be required for the settling-chamber or its roof or its floor may be effected by means of implements inserted into the tanks as usual in connection with glass melting tanks, and if, in cases of emergency, the outlet-block requires removal as for purposes of renewal as before referred to, the settling-chamber with its floor, and with or without its roof may be abnormally elevated and form within the tank a cofferdam leaving the operative quite at liberty to remove and replace the outlet-block.

In the working of glass melting tanks it is a matter of common observation that no matter how satisfactory may be the condition of glass within the tank at some point near the top of that mass, those portions of the mass at and near the walls of the tank are of a character inclined toward stringiness, this being due largely to the fact that the cutting of the inwalls of the tank produces corrugations or general roughness and some refrigeration. The glass in this condition is quite unfit for employment in glass-drawing apparatus. But in my invention the flow of glass to the outlet from regions near the tank wall is quite prevented, the intake through the notch 8 being at a point far within the tank at any desired distance according to the proportions adopted for the settling-chamber.

It is to be observed in Figs. 1 and 2 that the outlet block 4 is projected a distance inwardly beyond the inner surface of the inwall. This projection has two offices. First, in the absence of the settling-chamber or its floor or roof, the projection insures that the glass received by the outlet block should not be glass in immediate contact with the wall of the tank, and, 2nd, the outflow of glass through the outlet results in a wearing away of the inner end of the outlet conduit, and the inward projection herein provided for will allow for more wear than would otherwise be permissible, while the ready removability and renewability of the outlet-block as before referred to, provides for taking care of the excessive wear of the inner end of the outlet conduit. It is to be observed that the outlet block is not shouldered and that it may, in being set in the opening of the tank, be pushed through the opening in the wall thereof as far as the position of gate 6 will permit, therefore, the lessening of the projection of the inner end of the outlet-block due to its wearing away may be compensated for by readjusting it farther into the furnace.

I claim:

A glass melting tank accessory consisting of a settling chamber disposed at the outlet from the tank and adapted to isolate molten glass from the general mass within the tank and having that one of its walls farthest from the outlet lower than the side-walls so as to form a dam, substantially as set forth.

LEOPOLD MAMBOURG.

Witnesses:
M. S. BELDEN,
H. M. MILDERS.